(12) United States Patent
Chang

(10) Patent No.: US 7,409,005 B2
(45) Date of Patent: Aug. 5, 2008

(54) HIGH SPEED DATA TRANSMITTER AND TRANSMITTING METHOD THEREOF

(75) Inventor: Chi Chang, Taipei (TW)

(73) Assignee: Via Technologies, Inc., Taipei (TW)

( * ) Notice: Subject to any disclaimer, the term of this patent is extended or adjusted under 35 U.S.C. 154(b) by 725 days.

(21) Appl. No.: 10/355,406

(22) Filed: Jan. 31, 2003

(65) Prior Publication Data

US 2003/0194018 A1    Oct. 16, 2003

(30) Foreign Application Priority Data

Apr. 15, 2002    (TW) .............................. 91107592 A

(51) Int. Cl.
*H04L 27/04*    (2006.01)
(52) U.S. Cl. .................. 375/295; 365/233.11
(58) Field of Classification Search ................ 375/295; 327/291; 332/106; 341/20, 173; 365/233.1, 365/233.11, 233.13; 711/104, 105, 169, 711/173
See application file for complete search history.

(56) References Cited

U.S. PATENT DOCUMENTS

| | | | | |
|---|---|---|---|---|
| 5,550,874 A * | 8/1996 | Lee | ............................. | 375/354 |
| 5,615,376 A * | 3/1997 | Ranganathan | ............... | 713/322 |
| 5,757,871 A * | 5/1998 | Furukawa et al. | ........... | 375/372 |
| 5,850,422 A * | 12/1998 | Chen | .......................... | 375/371 |
| 6,031,401 A * | 2/2000 | Dasgupta | .................... | 327/116 |
| 6,130,558 A * | 10/2000 | Lee | ............................. | 326/93 |
| 6,449,329 B1 * | 9/2002 | Halter | ......................... | 377/114 |
| 6,452,591 B1 * | 9/2002 | Ho et al. | ..................... | 345/213 |
| 6,477,657 B1 * | 11/2002 | Kurd et al. | .................. | 713/501 |
| 6,614,371 B2 * | 9/2003 | Zhang | ........................ | 341/101 |
| 6,993,108 B1 * | 1/2006 | Chi et al. | .................... | 375/376 |
| 2002/0175740 A1 * | 11/2002 | Ruegg et al. | ................ | 327/408 |
| 2003/0038681 A1 * | 2/2003 | Djafari et al. | ............... | 331/1 A |
| 2005/0123236 A1 * | 6/2005 | Ko et al. | ....................... | 385/24 |

FOREIGN PATENT DOCUMENTS

WO    WO 99/19806    4/1999

OTHER PUBLICATIONS

Nikola Nedovic, Timing Characterization of Dual-Edge Triggered Flip-Flops, Advanced Computer Systems Engineering Laboratory Department of Electrical and Computer Engineering, Proceedings of the International Conference on Computer Design: VLSI in Computers & Processors (ICCD'01), 1063-6404/01 $10.00© 2001 IEEE.*

* cited by examiner

*Primary Examiner*—Kevin Y Kim
(74) *Attorney, Agent, or Firm*—Kirton & McConkie; Evan R. Witt

(57) ABSTRACT

A transmitter for transmitting data in response to N clock signals with the same period T is provided. Every two adjacent clock signals have a phase difference of T/N therebetween. The transmitter includes a clock synthesizer and a multiplexer. The clock synthesizer sequentially generates N select signals in response to level-switch states of the N clock signals, respectively, during the period T. The multiplexer is electrically connected to the clock synthesizer for selecting one of N input data signals to be outputted in response to a corresponding one of the N select signals in turn. A method for transmitting data with eliminated duty-cycle effect is also disclosed.

15 Claims, 6 Drawing Sheets

HIGH SPEED DATA TRANSMITTER AND TRANSMITTING METHOD THEREOF

FIELD OF THE INVENTION

The present invention relates to a high speed data transmitter, and more particularly to a transmitter for transmitting data at a high transmission rate in response to a low frequency clock signal. The present invention also relates to a method for transmitting data.

BACKGROUND OF THE INVENTION

In a typical computer system, a core logic circuit such as a chipset, is widely used to control data flows among a central processing unit (CPU), a system memory and a plurality of input/output (I/O) devices. Recently, the processing frequency of the core logic circuit is increasingly improved. The speeds of data flows on the I/O buses, however, could not catch up with the step of the chipset. The major factors include the design of transmitters/receivers, type of package, construction of substrates and routing of circuit boards, for example. Therefore, the limitation of the I/O buses on bandwidth is required to be overcome.

A Double Data Rate (DDR) transmitter 10, with reference to FIGS. 1(a) and 1(b), was developed to meet these needs. The DDR transmitter 10 outputs data at both the rising and falling edges of a clock signal CK_0. Since data transmission are performed twice for each cycle of the clock signal CK_0, the data throughput doubles.

The transmitter 10 principally comprises two flip-flop devices 12 and 14, a multiplexer 16 and a pad circuit 18. First, three clock signals CK_90, CK_180 and CK_270 having the same frequency as the clock signal CK_0 are generated by a phase-locked loop circuit (not shown). The phase differences between these clock signals CK_90, CK_180 and CK_270 and the clock signal CK_0 are 90, 180 and 270 degrees, respectively. The flip-flop device 14 is latched in response to the rising edge of the clock signal CK_90, and sequentially outputs low-bit data DL including the first, the third, . . . , and the (2J+1) data as output data DXL, where J is an integer. The flip-flop device 12 is latched in response to the rising edge of the clock signal CK_270, and sequentially outputs high-bit data DH including the second, the fourth . . . , and the (2J)th data as output data DXH. The multiplexer 16 selects one of the two output data DXH and DXL from the flip-flop devices 12 and 14, respectively, to be outputted as output data TX_D to the pad circuit 18. The multiplexer 16 allows the output data DXH and DXL to be alternately outputted in response to a select signal, i.e. the clock signal CK_0. When the clock signal CK_0 turns to a low level, the low-bit data DXL is selected as the output data TX_D. On the other hand, when the clock signal CK_0 turns to a high level, the multiplexer 16 selects the high-bit data DXH to be the output data TX_D. Therefore, the data TX_D is outputted at a double data rate.

As is known, the valid data bit time for transmitting data on an I/O bus depends on the clock signal. In order to obtain precise and uniform valid data bit time, it is important to acquire a clock signal with a balanced duty cycle, i.e. 50%. The clock signal for the present purpose is generally provided by a clock generator and outputted by a phase-locked loop circuit. The clock signal of a 50% duty cycle provides the data flowing through the bus a unified data bit time. Unfortunately, it is difficult to control the duty cycle of the clock signal to be exactly 50% all the time. In general, the duty cycle of the clock signal outputted by the phase-locked loop circuit has a variation between about 48% and about 52%. Therefore, the use of the clock signal CK_0 with unbalanced duty cycle as a select signal of the multiplexer 16 will lead to inconsistent data bit time on the I/O bus. Thus, the setup/hold time margin will greatly decrease. Furthermore, when the data transfer speed on the bus is required to be higher and higher, it is even difficult to design a phase-locked loop circuit capable of providing various clock signals with a variety of phase differences.

SUMMARY OF THE INVENTION

Therefore, it is an object of the present invention to provide a transmitter and a method for transmitting data with eliminated duty-cycle effect.

In accordance with an aspect of the present invention, there is provided a transmitter for transmitting data in response to N clock signals with the same period T, in which every two adjacent clock signals have a phase difference of T/N therebetween. The transmitter includes a clock synthesizer and a multiplexer. The clock synthesizer sequentially generates N select signals in response to level-switch states of the N clock signals, respectively, during the period T. The multiplexer is electrically connected to the clock synthesizer for selecting one of N input data signals to be outputted in response to a corresponding one of the N select signals in turn.

In an embodiment, the level-switch states are all rising edges or all falling edges.

In an embodiment, each of the N select signals is kept at a high level for a time period of T/N, during which the selected one of the N input data signals is allowed to be outputted by the multiplexer.

In an embodiment, the N clock signals are generated by a phase-locked loop circuit according to a reference clock signal with a period of T/2.

Preferably, N=4.

Preferably, the transmitter further includes N flip-flop devices electrically connected to the multiplexer for sequentially latching and outputting the N input data signals to the multiplexer in response to the level-switch states of the N clock signals, respectively.

In accordance with another aspect of the present invention, there is provided a transmitter for transmitting data in response to N clock signals derived from a reference clock signal of a first period. The transmitter includes a clock synthesizer and a multiplexer. The clock synthesizer generates N select signals in response to the N clock signals, respectively, during a second period correlating to the first period of the reference clock signal. The multiplexer is electrically connected to the clock synthesizer and receiving N input data signals, wherein the N input data signals are sequentially selected to be outputted in response to the N select signals sequentially generated, respectively.

In an embodiment, each of the N select signals is generated in response to a rising edge or a falling edge of one of the N clock signals.

Preferably, The first period is T/2, and the second period is T.

Preferably, N=4, and each of the N select signals is kept at a high level for a third period of T/4.

Preferably, the transmitter further comprises N flip-flop devices electrically connected to the multiplexer, and receiving the N clock signals and the N input data signals, wherein the N input data signals are latched successively in response to level-switch states of the N clock signals occurring in series and transmitted to the multiplexer.

In accordance with another aspect of the present invention, there is provided a method for transmitting data. Firstly, N clock signals in response to a reference clock signal of a first period are provided. During a second period correlating to the first period of the reference clock signal, N select signals are sequentially generated in response to the N clock signals, respectively. Then, N input data signals are received, wherein the N input data signals are sequentially selected to be outputted in response to the N select signals sequentially generated, respectively. Preferably, the method further includes a step of receiving the N clock signals and the N input data signals, wherein the N input data signals are latched successively in response to level-switch states of the N clock signals occurring in series.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1A:
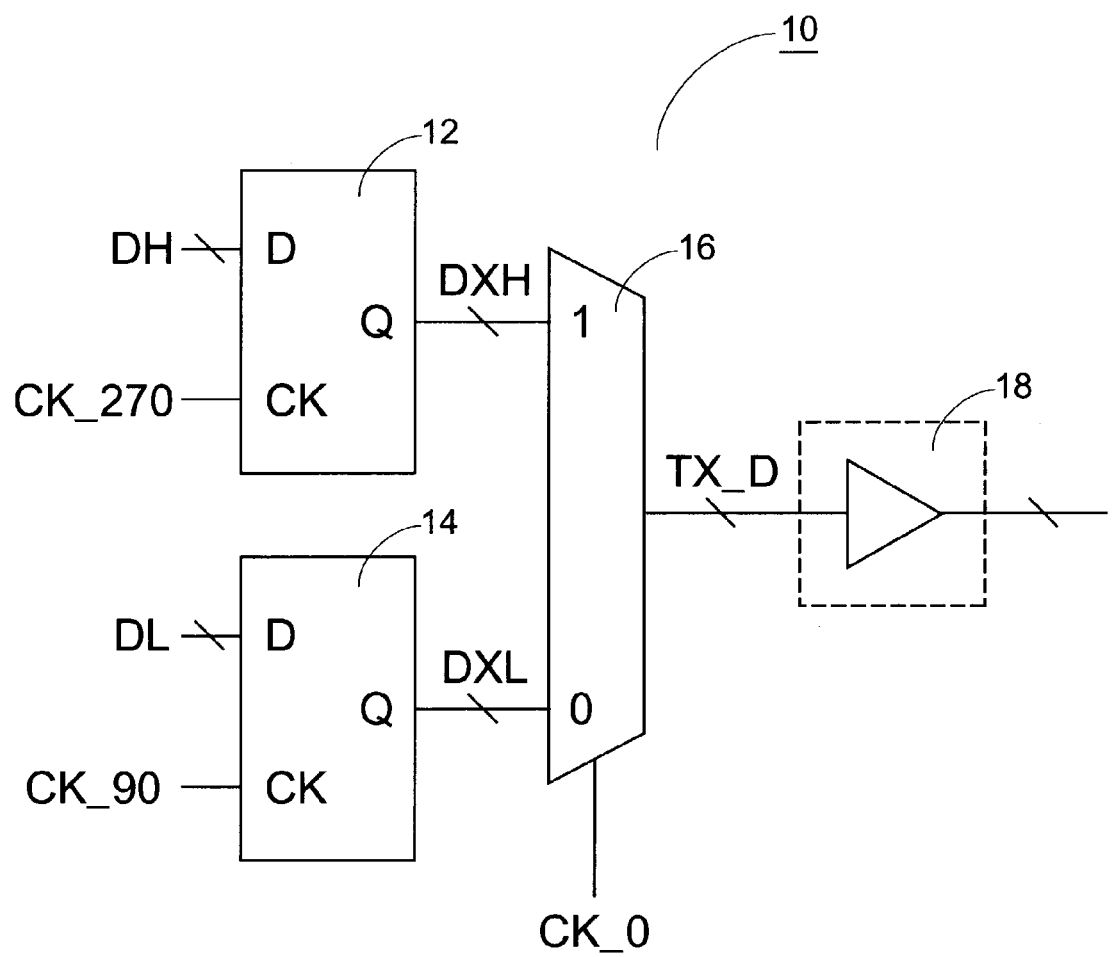
FIG. 1(a) is a functional block diagram of a typical Double Data Rate (DDR) transmitter.
Figure 1B:
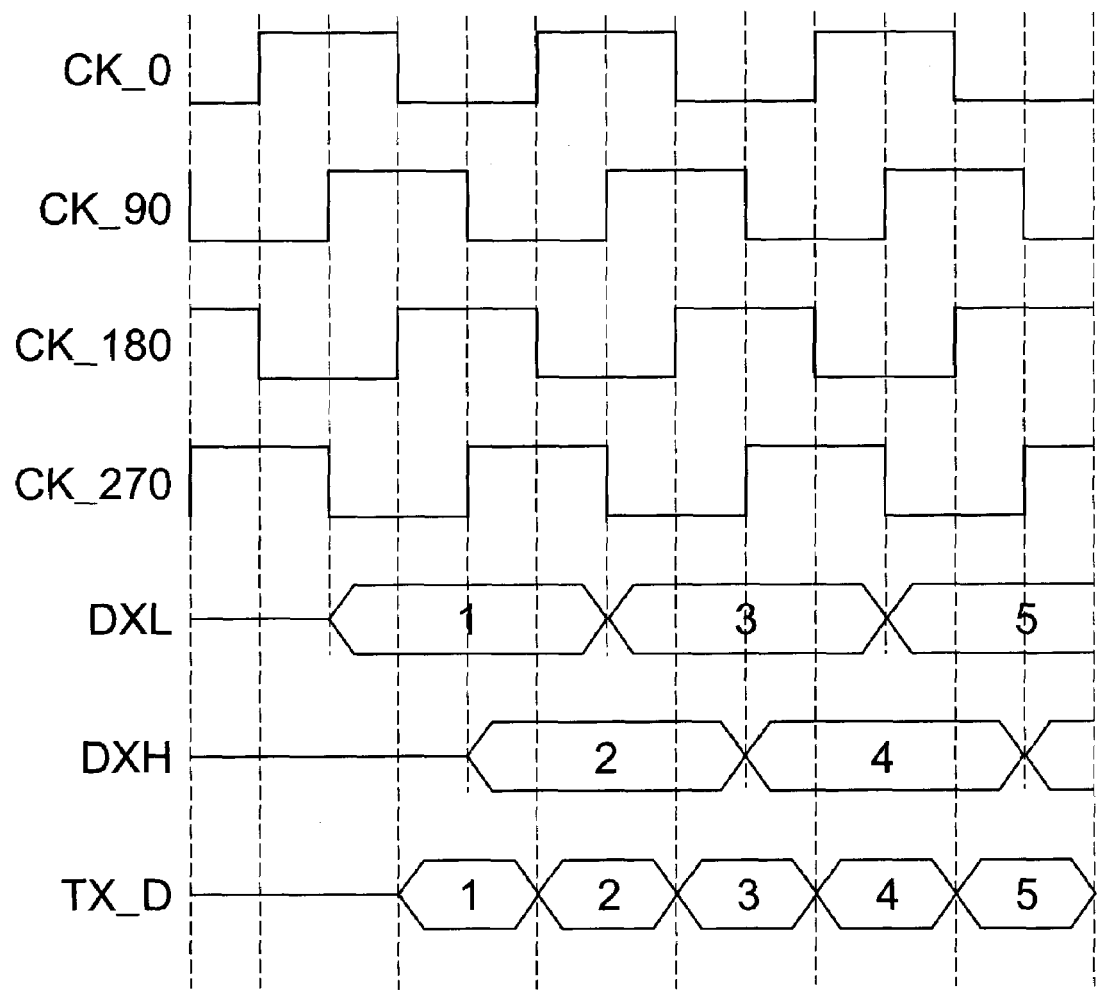
FIG. 1(b) is a timing waveform diagram illustrating the related signals processed in the DDR transmitter of FIG. 1(a)
Figure 2A:
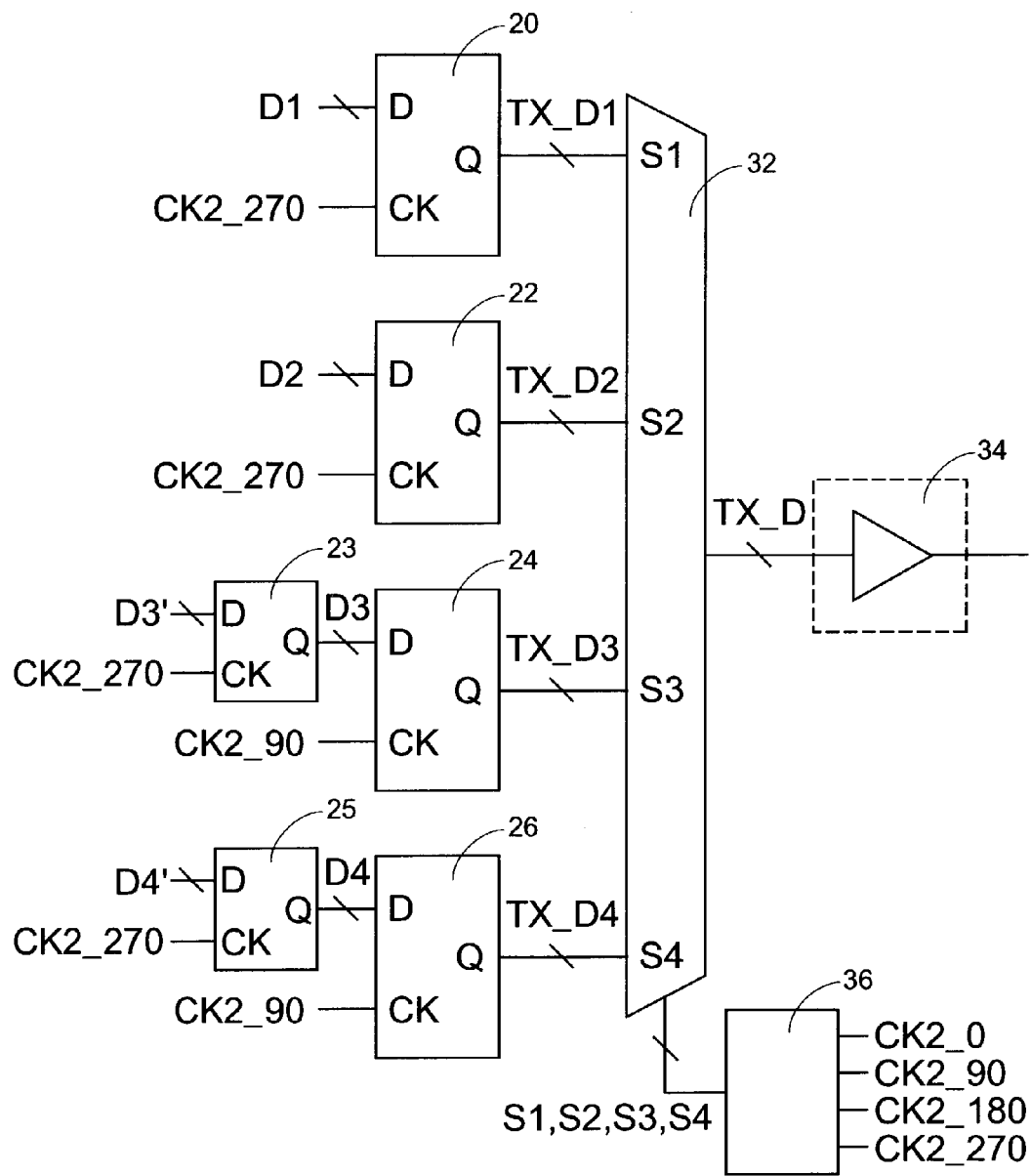
FIG. 2(a) is a functional block diagram of a data transmitter according to a preferred embodiment of the present invention.
Figure 2B:
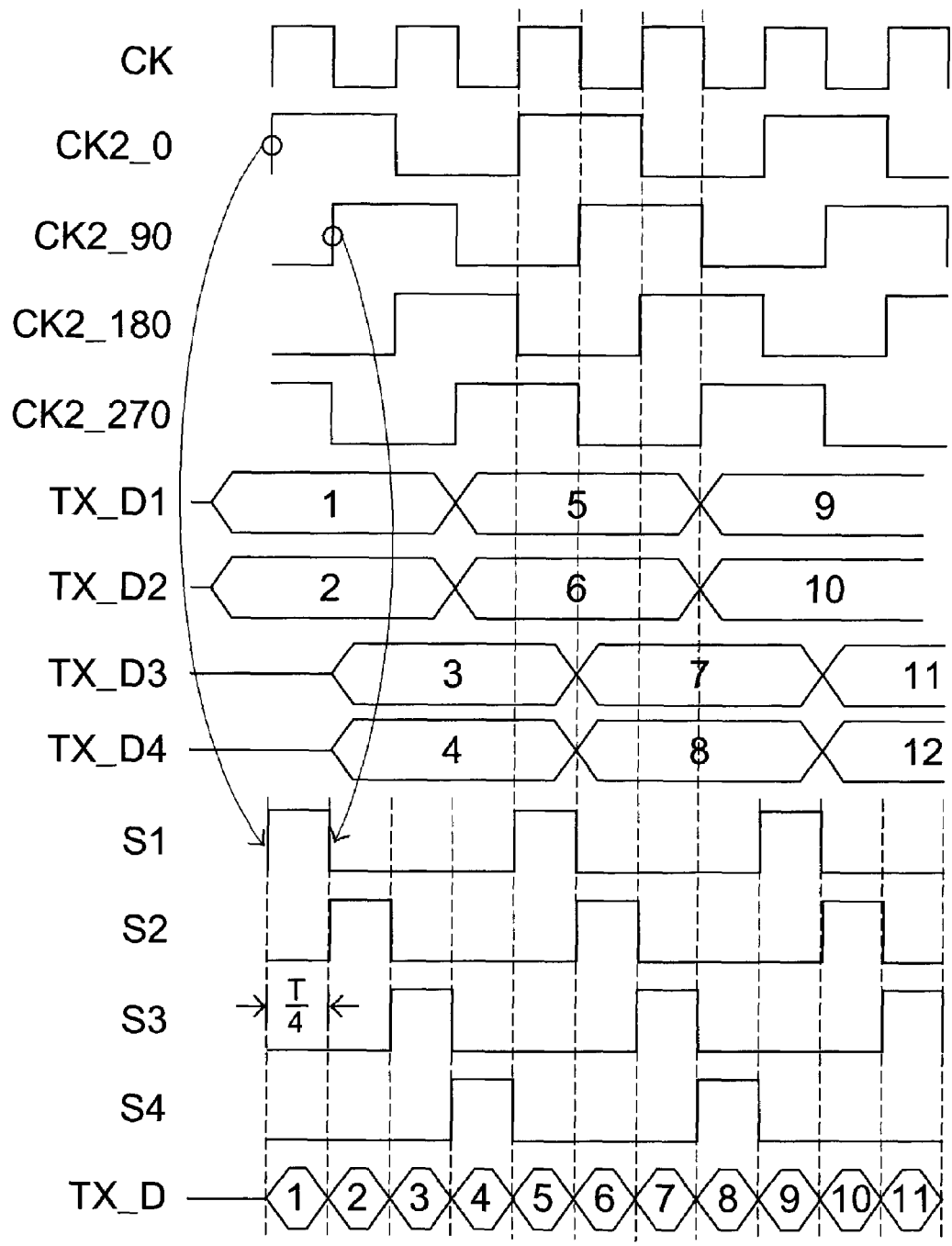
FIG. 2(b) is a timing waveform diagram illustrating the related signals processed in the data transmitter of FIG. 2(a)

FIG. 2(a) is a functional block diagram illustrating a data transmitter according to a preferred embodiment of the present invention, and the timing waveform diagram of the processed signals is shown in FIG. 2(b). The data transmitter of the present invention principally comprises four flip-flop devices 20, 22, 24 and 26, a multiplexer 32, a pad circuit 34 and a clock synthesizer 36. First, a reference clock signal CK having a period of T/2 is provided. Then, four clock signals CK2_0, CK2_90, CK2_180 and CK2_270 having half the frequency of the reference clock signal CK, i.e. each having a time period of T, are generated by a phase-locked loop circuit (not shown) in advance. The phase differences between the clock signals CK2_90, CK2_180 and CK2_270 and the clock signal CK2_0 are 90, 180 and 270 degrees, respectively. The input ends D1, D2, D3 and D4 of the flip-flop devices 20, 22, 24 and 26 receive data from the lowest to the highest bytes. After being processed, these data sets are transmitted to the multiplexer 32 via output ends TX_D1, TX_D2, TX_D3 and TX_D4, respectively.

The four clock signals CK2_0, CK2_90, CK2_180 and CK2_270 are further inputted to the clock synthesizer 36 to sequentially generate four select signals S1, S2, S3 and S4. As shown in FIG. 2(b), each of the select signals S1, S2, S3 and S4 is interlacingly kept at a high level for a time period of T/4. The high level duration of the select signal S1 appears only between the rising edges of the adjacent clock signals CK2_0 and CK2_90, the high level duration of the select signal S2 appears only between the rising edges of the adjacent clock signals CK2_90 and CK2_180, the high level duration of the select signal S3 appears only between the rising edges of the adjacent clock signals CK2_180 and CK2_270, and the high level duration of the select signal S4 appears only between the rising edges of the adjacent clock signals CK2_270 and CK2_0. In response to the high-level states of the select signal S1, S2, S3 and S4, data transmission is coordinated in a manner as described hereinafter.

At the rising edge of the clock signal CK2_270, the data inputted through the input ends D1 and D2 will be latched by the first and the second flip-flop devices 20 and 22. Likewise, the data inputted through the input ends D3 and D4 will be latched by the third and the fourth flip-flop devices 24 and 26 at the rising edge of the clock signal CK2_90. In other words, the flip-flop device 20, in response to the rising edges of the clock signal CK2_270, sequentially latches and outputs the data signals including the first, the fifth, the ninth, . . . , and the (4k+1)th data, to the first output end TX_D1, where k is an integer. The flip-flop device 22 in response to the rising edges of the clock signal CK2_270, sequentially latches and outputs the data signals including the second, the sixth, the tenth, . . . , and the (4k+2)th data, to the second output end TX_D2. Similarly, the flip-flop device 24 and 26 in response to the rising edges of the clock signal CK2_90, sequentially latch and output the data signals including the third, the seventh, the eleventh, . . . , and the (4k+3)th data, to a third output end TX_D3 and the data signals including the fourth, the eighth, the twelfth, . . . , and the (4k)th data, to a fourth output end TX_D4, respectively. The multiplexer 32 has four input ends electrically connected to the four output ends TX_D1, TX_D2, TX_D3 and TX_D4 of the flip-flop devices 20, 22, 24 and 26, respectively, and has an output end TX_D electrically connected to the pad circuit 34. The multiplexer 32 allows the data to be outputted in sequence in response to the four select signals S1, S2, S3 and S4 in turn. For example, when the select signal S1 is at the high level, the data $D_1$ latched by the flip-flop device 20 and outputted to the multiplexer 32 via the end TX_D1 is selected to be outputted to the pad circuit 34 via the end TX_D. When the select signal S2 is at the high level, the data $D_2$ latched by the flip-flop device 22 and outputted to the multiplexer 32 via the end TX_D2 is selected to be outputted to the pad circuit 34 via the end TX_D, and so on.

Figure 3A:
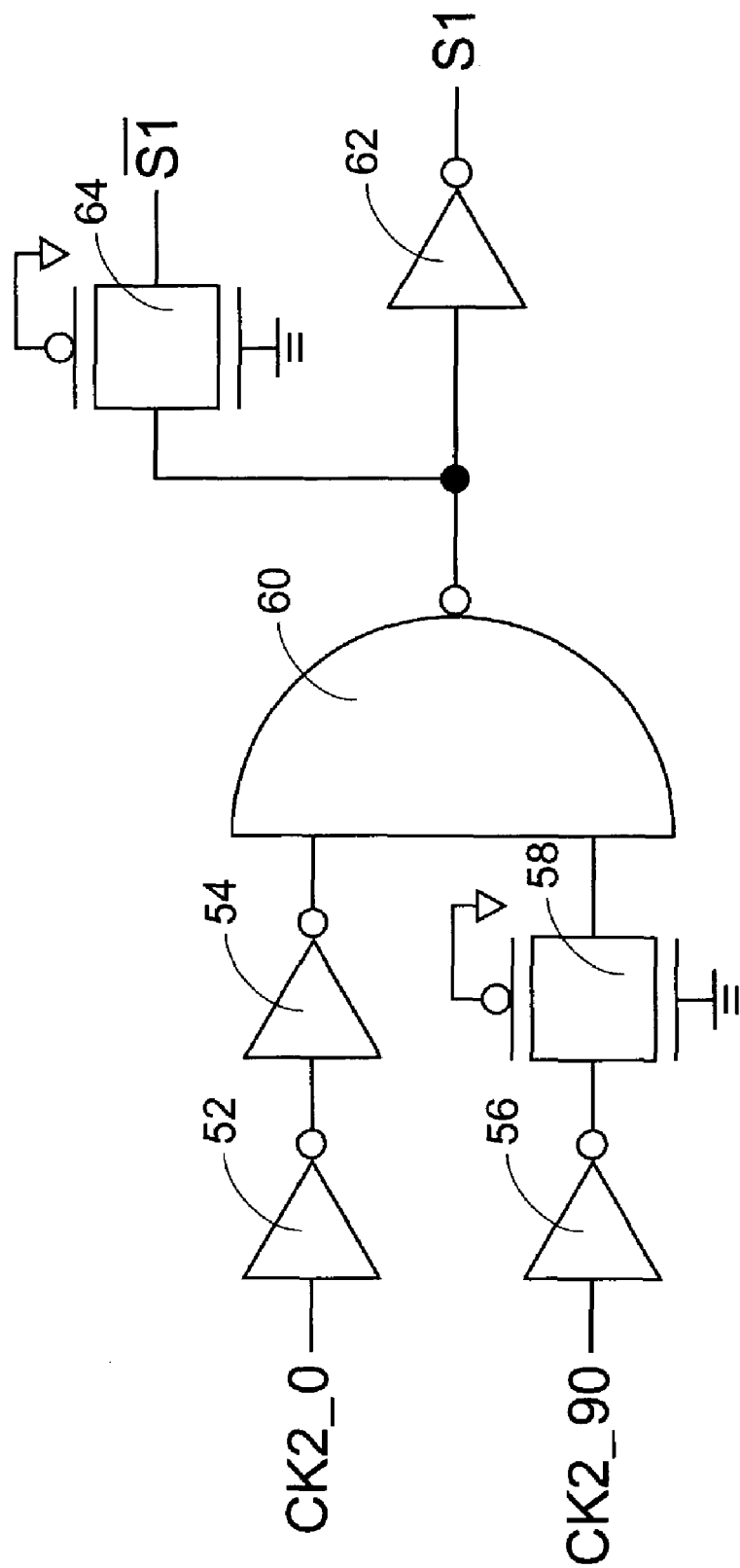
FIG. 3(a) is a circuit diagram of an exemplified clock synthesizer of the data transmitter of FIG. 2(a)
Figure 3B:
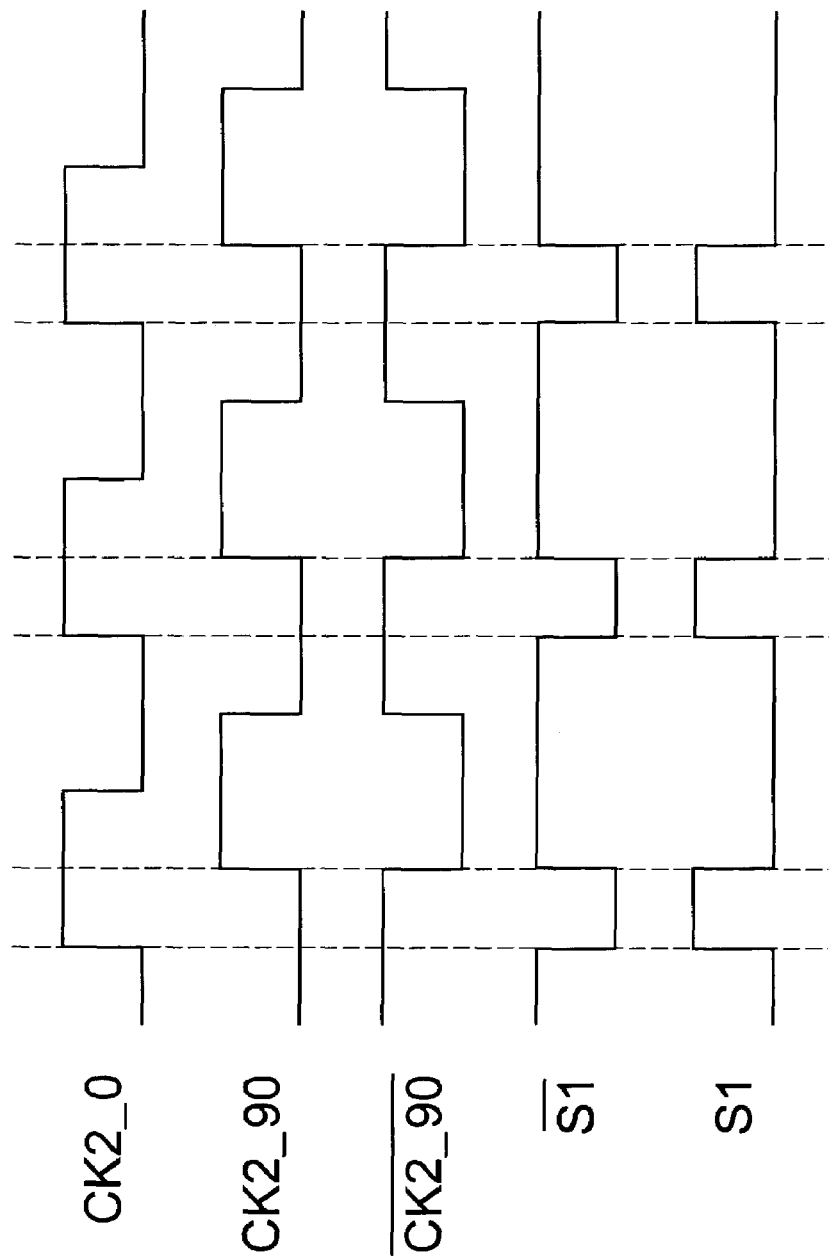
FIG. 3(b) is a timing waveform diagram illustrating the synthesis of the select signal S1 in the clock synthesizer of FIG. 3(a).

FIGS. 3(a) and 3(b) illustrate the synthesis of the select signal by an exemplified clock synthesizer. The clock synthesizer includes four inverters 52, 54, 56 and 62, a NAND gate 60, and two transmission gates 58 and 64. Take the select signal S1 as an example. The clock signal CK2_0 is transferred through the serially interconnected inverters 52 and 54 into the NAND gate 60, and another clock signal CK2_90 is transferred through the serially interconnected inverter 56 and transmission gate 58 into the NAND gate 60. Being operated by the NAND gate 60, the signal is outputted to another inverter 62 and another transmission gate 64 to generate the select signal S1 and the complementary signal $\overline{S1}$. The transmission gate 58 and 64 are utilized to compensate the delays of the inverter 54 and 62, respectively. With such configuration, the select signal S1 is synthesized in response to the two clock signals CK2_0 and CK2_90. Similarly, the select signals S2, S3 and S4 are synthesized in response to two adjacent clock signals CK2_90 and CK2_180, CK2_180 and CK2_270, and CK2_270 and CK2_0, respectively.

Since the select signals are determined by means of precise clock signals generated by phase-locked loop circuit, the problem of unbalanced duty cycle can be overcome, and precise and uniform valid data bit time can be achieved according to the present invention. Furthermore, due to the reduced frequency of the clock signal, a phase-locked loop circuit is capable of processing relatively long bit length of data. Therefore, the data transmitter of the present invention is advantageous when the data transfer speed on the I/O bus is higher and higher.

The present invention is illustrated by sequentially generating the select signals in response to rising edges of clock signals. Nevertheless, the select signals can be also generated in response to falling edges of clock signals.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A transmitter for transmitting data with unified valid data bit time, comprising:
   a clock synthesizer sequentially generating N select signals in response to a specific level-switch state of N clock signals, said N clock signals having the same period T but a phase difference T/N between two adjacent clock signals, and logically operated to synthesize said N select signals so that each of said N select signals has a high level of a duration T/N;
   a multiplexer electrically connected to said clock synthesizer for selecting one of N input data signals to be outputted in response to a corresponding one of said N select signals at said high level in turn; and
   N flip-flop devices electrically connected to said multiplexer for sequentially latching and outputting said N input data signals to said multiplexer in response to said specific level-switch state of said N clock signals, respectively.

2. The transmitter according to claim 1 wherein said specific level-switch state is a rising edge or a falling edge.

3. The transmitter according to claim 1 wherein said N clock signals are generated by a phase-locked loop circuit according to a reference clock signal with a period of T/2.

4. The transmitter according to claim 1 wherein N=4.

5. A transmitter for transmitting data in response to N clock signals derived from a reference clock signal with a first period, comprising:
   a clock synthesizer generating N select signals with sequential high levels by logically operating said N clock signals with a second period different from said first period of said reference clock signal;
   a multiplexer electrically connected to said clock synthesizer for receiving N input data signals, and selecting one of said N input data signals to be outputted in response to a corresponding one of said N select signals at a high level; and
   N flip-flop devices electrically connected to said multiplexer, and receiving said N clock signals and said N input data signals, wherein said N input data signals are latched successively in response to level-switch states of said N clock signals occurring in series and transmitted to said multiplexer.

6. The transmitter according to claim 5 wherein each of said N select signals is generated in response to a rising edge or a falling edge of one of said N clock signals.

7. The transmitter according to claim 5 wherein said first period is T/2, and said second period is T.

8. The transmitter according to claim 5 wherein N=4, and each of said N select signals is kept at a high level for a duration T/4.

9. A method for transmitting data comprising steps of:
   providing N clock signals in response to a reference clock signal with a first period;
   generating N select signals with sequential high levels by logically operating said N clock signals with a second period different from said first period of said reference clock signal;
   receiving N input data signals, and selecting one of said N input data signals to be outputted in response to a corresponding one of said N select signals at a high level; and
   receiving said N clock signals and said N input data signals, wherein said N input data signals are latched successively in response to level-switch states of said N clock signals occurring in series.

10. The method according to claim 9 wherein each of said N select signals is generated in response to a rising edge or a falling edge of one of said N clock signals.

11. The method according to claim 9 wherein said first period is T/2, and said second period is T.

12. The method according to claim 9 wherein N=4, and each of said N select signals is kept at a high level for a duration T/4.

13. The method according to claim 10 wherein the clock synthesizer generates one of said N select signals with a rising edge and a falling edge consistent with rising edges of two adjacent ones of said N clock signals.

14. The transmitter according to claim 2 wherein the clock synthesizer generates one of said N select signals with a rising edge and a falling edge consistent with rising edges of two adjacent ones of said N clock signals.

15. The transmitter according to claim 6 wherein the clock synthesizer generates one of said N select signals with a rising edge and a falling edge consistent with rising edges of two adjacent ones of said N clock signals.

* * * * *